J. E. & W. L. WILLIAMS.
TRAIN CONTROL.
APPLICATION FILED APR. 23, 1913.
1,075,133.
Patented Oct. 7, 1913.
2 SHEETS—SHEET 2.
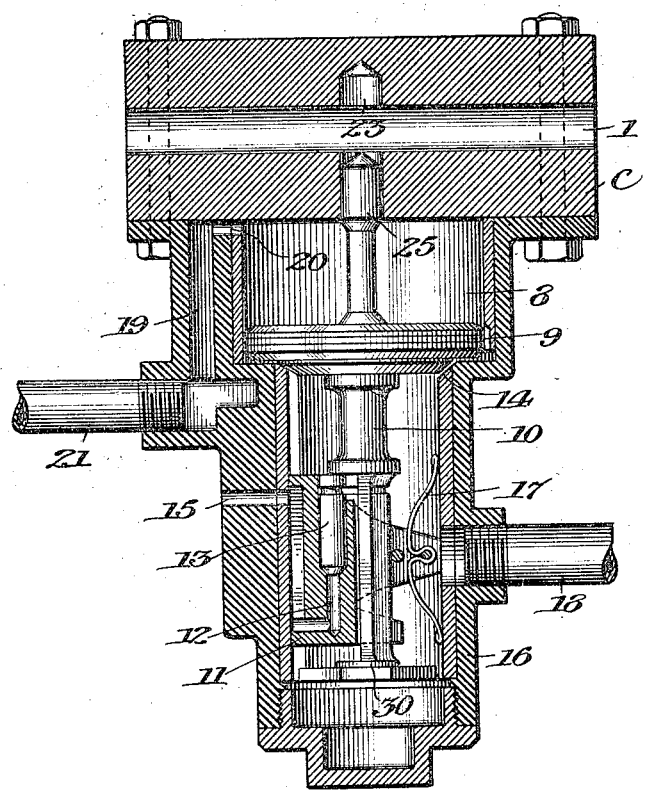
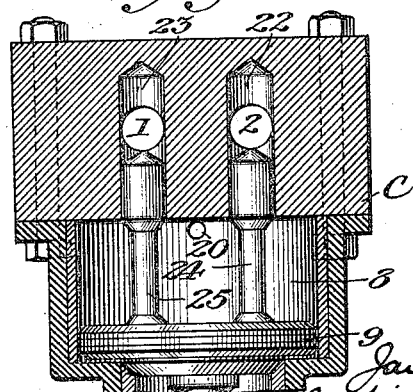

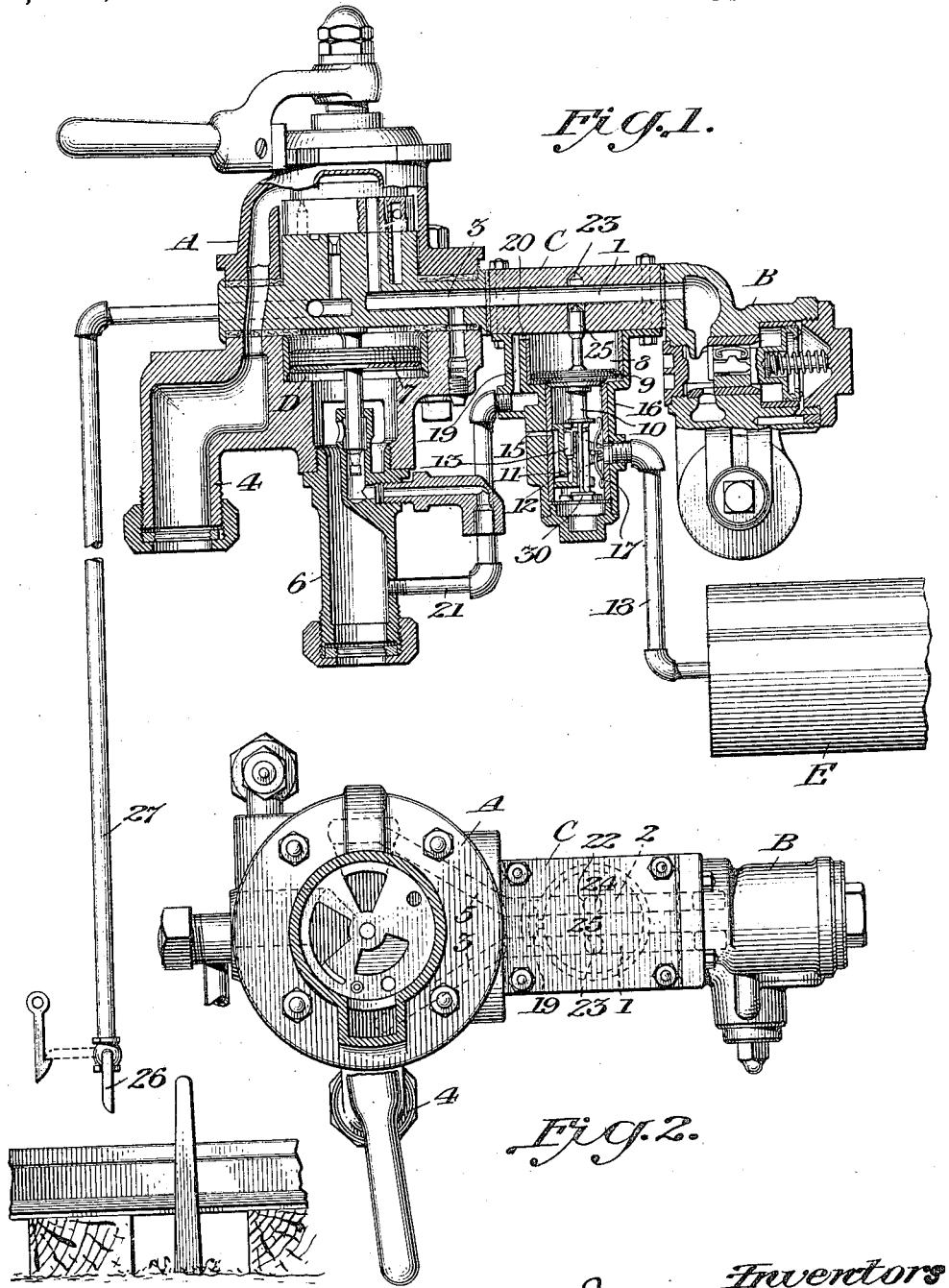

UNITED STATES PATENT OFFICE.

JAMES E. WILLIAMS AND WILLIAM L. WILLIAMS, OF WILLIMANTIC, CONNECTICUT.

TRAIN CONTROL.

1,075,133.   Specification of Letters Patent.   Patented Oct. 7, 1913.

Application filed April 23, 1913. Serial No. 763,048.

*To all whom it may concern:*

Be it known that we, JAMES E. WILLIAMS and WILLIAM L. WILLIAMS, citizens of the United States, residing at Willimantic, in county of Windham and State of Connecticut, have invented certain new and useful Improvements in Train Controls, of which the following is a specification.

This invention relates to an improvement in a controlling device for air brake systems, and the object is to provide means whereby upon any reduction of pressure in the brake pipe the flow of the fluid or air will be cut off between the slide-valve feed valve and the engineer's brake valve.

In double heading; that is, where two engines are connected together, it is necessary to cut out one of the engines from the air system, and the engineer of the pilot or head engine has control of the braking system. With this device, either engineer; that is, the engineer of the pilot engine or the second engine, can have control over the braking system, and in case one engineer sets the brakes or causes a reduction of pressure in the brake pipe, the controlling device, which consists of a valve, will close the air passage between the feed valve and the engineer's brake valve on each engine, and cause the brakes to remain set, and this valve device will remain in the position for cutting off the flow of fluid from the feed valve to the brake valve until the engineer of one of the engines throws his handle or lever of the brake valve to "release" position, when the air system will be replenished and the valve will be caused, by the increase of pressure to the brake pipe, to be moved out of the path of the conduit or passage between the feed valve and the engineer's valve. From this it will be seen that either engineer can apply the brakes and either engineer can cause the brakes to be released by throwing his handle or lever to a "release" position, this, of course, being governed by the position of the engineer's brake handle when the brakes are set. For instance, if the brakes were set by the engineer on the pilot engine, the brake lever or handle of the engineer on the second engine would be in "running" position, and it would therefore be necessary for the engineer on the second engine, before releasing the brakes, to throw his lever to "release" position to cause the valve to be released and caused to move from the passage between the feed valve and engineer's brake valve.

Another advantage is in case of a break in the train line, such as the breaking of a hose, the valve will automatically move to a position for preventing the flow of the fluid from the feed valve to the engineer's brake valve, and will thereby prevent the main reservoir pressure from escaping to atmosphere, and the engineer will not be required to move his lever or handle to "lap" position.

Another advantage or application of this device is: With a train control wherein an air pipe is connected to the chamber of the engineer's valve above the equalizing piston and said pipe is connected with a valve trip device, which trip device is adapted to strike obstructions in case an engineer should pass a signal indicating a stop, the valve would, in this instance, upon the actuation of the trip, which would cause a reduction of pressure in the brake pipe, move to a position for shutting off the flow of the fluid or air between the feed valve and brake valve.

The invention consists of certain novel features of construction and combinations of parts which will be hereinafter described and pointed out in the claims.

In the accompanying drawings: Figure 1 is a longitudinal vertical sectional view showing the invention applied between the engineer's brake valve and a slide-valve feed valve; Fig. 2 is a top plan view thereof; Fig. 3 is an enlarged vertical sectional view of the invention; and Fig. 4 is a cross-sectional view.

A represents the engineer's brake valve, and B the slide-valve feed valve.

C represents the casing of the controlling device, which is mounted and supported preferably between the engineer's brake valve and the feed valve. The casing C has two longitudinal openings or passages 1 and 2 therein, which passages are in registry with the passage of the feed valve and engineer's brake valve, the passage 1 registering with the passage 3, through which the fluid from the main reservoir flows. The main reservoir is not disclosed, but is connected to the engineer's brake valve by a suitable connection with the pipe 4. The passage 2 is connected to a passage 5 leading through the engineer's brake valve, and which is in communication with the brake pipe 6. A chamber D is formed in the brake valve, in which is located an equalizing piston 7.

The details of construction and the location of parts of the engineer's brake valve and the feed valve B do not form any part of the invention, but they are of the type adopted and used on the Westinghouse air brake systems, and it is the intention that they be used in connection with this invention.

A piston chamber 8 is formed in the casing, and mounted therein is a piston 9. The piston 9 is provided with a stem 10, upon which is loosely mounted a slide valve 11. The slide valve is provided with a passage 12, in which is mounted a pin 13, which pin is connected to the stem 10, and when the piston is on its seat 14, the pin closes the passage or conduit 12. The passage 12 is open along one side thereof, and is adapted to be brought into registry with a port 15 in the valve chamber 16. A spring 17 is connected to the valve 11 for normally holding the valve against the wall of the valve chamber. An auxiliary reservoir E is connected to the valve chamber 16 by a pipe 18. An outlet chamber 19 is formed on the casing which is in communication with the piston chamber 8 by means of a port 20. A pipe 21 connects the outlet chamber 19 with the brake pipe 6.

Valve ports 22 and 23 are formed in the casing leading from the piston chamber 8 and extending through the passages 1 and 2. A valve port 22 passes through the passage 2 and the valve port 23 extends through the passage 1. Valves 24 and 25 are connected to the piston 9, and are received in the ports 22 and 23. These valves are normally out of the passages 1 and 2, but upon the reduction of pressure in the brake pipe, these valves are caused to move, whereby the passages 1 and 2 are closed by the valves 24 and 25.

Assuming that there has been a reduction in the pressure in the brake pipe caused by the application of the brakes by the engineer, or by an engineer of the double header, a break in the train pipe, or by the action of the tripping lever 26, which is connected to a pipe 27, which pipe is connected with the chamber D of the engineer's brake valve, there would be a reduction of the pressure in the chamber 8 as the air would be drawn from the piston chamber 8 through the port 20 and pipe 21. The pressure in the valve chamber is now greater than the pressure in the valve chamber 8, although under normal conditions the pressures are equal. The air pressure in the auxiliary reservoir E will cause the piston 9 to move in the valve chamber 8, causing the valves 24 and 25 to close the passages 1 and 2, thereby shutting off the flow of the fluid between the feed valve and the engineer's brake valve.

As the piston 9 moves upwardly, it withdraws the pin 13 from its seat in the passage or conduit 12, thereby allowing the air in the valve chamber to escape to the atmosphere through the port 15. This movement of the piston 9, which has suitable packing therearound for forming a tight fit within the wall of the piston chamber 8, causes the shoulder 30 on the end of the piston 10 to engage the valve 11 and carry the valve with it. The valve passage 12 continues to be open to the atmosphere, and the valves 24 and 25 on the piston 9 will close the passages 1 and 2 from the slide valve feed valve, and the pressure below the piston line will soon be less than the pressure above the piston. This reduction in pressure below the piston 9 will cause the piston to move downward sufficiently to permit pin 13 to close the passage 12, without withdrawing the valves 24 and 25 from the passages 1 and 2. The pressure upon the closing of the passage 12 will be equal on both sides of the piston and the piston will not move farther until there is an increase of pressure in the brake pipe. Upon the throwing of the engineer's lever to a "release" position, the pressure in the brake pipe is again replenished, and the air pressure will flow from the brake pipe through the pipe 21 to the chamber 8, forcing the piston on to its seat, the air passing around the piston and into the valve chamber 16 and replenishing the auxiliary reservoir E until the pressures on opposite sides of the piston are equal. In case the train line should brake, the valves 24 and 25 would again be actuated in the same manner as above stated, and would prevent the air escaping from the main reservoir without the necessity of the engineer placing his lever or handle in "lap" position, which is now customary and necessary to retain the air in the main reservoir.

On some air brake equipments, for instance, E. T. equipments, the slide-valve feed valve is not connected directly to the engineer's brake valve, but they are connected together by means of piping, and it would not therefore be necessary that the feed valve and engineer's valve be connected together to make this invention applicable to them; in other words, they need not be connected together as shown in Fig. 1, but can be connected together by suitable piping, such as is used, for instance, in the E. T. equipment.

It is evident that slight changes might be made in the form and arrangement of the several parts described without departing from the spirit and scope of the invention, and hence it is not desired to limit the invention to the exact construction herein set forth, but:—

Having fully described our invention, what we claim as new and desire to secure by Letters Patent is:

1. In an automatic air brake, the combination with an engineer's brake valve and a feed valve in communication with each other, and means for closing said communication between said brake valve and feed valve upon the reduction in brake pipe pressure.

2. In an automatic air brake, the combination with an engineer's brake valve and a feed valve, of a valve for controlling the communication between the brake valve and feed valve, and means for closing said valve to be actuated upon the reduction in brake pipe pressure for closing said communication.

3. In an automatic air brake, the combination with an engineer's brake valve and a feed valve, of a valve for controlling the communication between the brake valve and feed valve, and means for closing said valve to be actuated upon the reduction in brake pipe pressure for closing said communication, said means operating upon the recharging of brake pipe pressure for actuating said valve to open communication between the brake valve and feed valve.

4. In an automatic air brake, the combination with a brake valve and a feed valve, of a valve for controlling the communication between the brake valve and feed valve, a piston connected to said valve adapted to be actuated upon the reduction in brake pipe pressure for operating the valve for closing said communication between the feed valve and brake valve.

5. In an automatic air brake, the combination with an engineer's brake valve and a feed valve, of a valve casing located between said brake valve and feed valve and in communication therewith, valves in said casing for closing the communication between the brake valve and feed valve, a piston chamber and a valve chamber in said casing, a piston mounted in said piston chamber and connected to the valves, means for connecting the piston chamber to the brake pipe of the engineer's brake valve whereby upon the reduction of brake pipe pressure, the pressure in the piston chamber will be reduced and the piston caused to move by the pressure exerted from the valve chamber for causing the valves to close communication between the brake valve and feed valve, and a valve actuated by said piston in the valve chamber for permitting the air pressure in said valve chamber to escape to atmosphere.

In testimony whereof we affix our signatures, in the presence of two witnesses.

JAMES E. WILLIAMS.
WILLIAM L. WILLIAMS.

Witnesses:
  ALICE D. STOUGHTON,
  GEORGE E. HINMAN.